US011829816B2

United States Patent
Kueckendahl (10) Patent No.: US 11,829,816 B2
(45) Date of Patent: Nov. 28, 2023

(54) METHOD AND MARKING APPARATUS FOR APPLYING A MARKING ON AN OBJECT

(71) Applicant: ALLTEC ANGEWANDTE LASERLICHT TECHNOLOGIE GMBH, Selmsdorf (DE)

(72) Inventor: Peter J. Kueckendahl, Bad Oldesloe (DE)

( * ) Notice: Subject to any disclaimer, the term of this patent is extended or adjusted under 35 U.S.C. 154(b) by 98 days.

(21) Appl. No.: 17/441,206

(22) PCT Filed: Jan. 13, 2020

(86) PCT No.: PCT/EP2020/050698
§ 371 (c)(1),
(2) Date: Sep. 20, 2021

(87) PCT Pub. No.: WO2020/187459
PCT Pub. Date: Sep. 24, 2020

(65) Prior Publication Data
US 2022/0156470 A1    May 19, 2022

(30) Foreign Application Priority Data

Mar. 20, 2019  (EP) ..................... 19164142

(51) Int. Cl.
*G06K 19/06* (2006.01)
*G06K 1/12* (2006.01)

(52) U.S. Cl.
CPC ....... *G06K 1/126* (2013.01); *G06K 19/06037* (2013.01)

(58) Field of Classification Search
CPC ............. G06K 1/126; G06K 19/06037; H04N 1/00278
See application file for complete search history.

(56) References Cited

U.S. PATENT DOCUMENTS 5,710,636 A * 1/1998 Curry ................. H04N 1/32256
                                                      235/494
5,790,703 A * 8/1998 Wang .................... G06T 1/0028
                                                      380/54

(Continued)

FOREIGN PATENT DOCUMENTS

EP          0927947 A2      7/1999
JP        2011-212728     * 10/2011    ............ B41M 5/262

OTHER PUBLICATIONS

PCT/EP2020/050698 International Search Report and Written Opinion, dated Apr. 8, 2020, 11 pages.

*Primary Examiner* — Thien M Le
(74) *Attorney, Agent, or Firm* — Wolter Van Dyke Davis, PLLC; Robert L. Wolter (57) ABSTRACT

The invention relates to a method for applying a marking on an object according to image data, wherein the image data comprises pixels with first pixel values and pixels with second pixel values, and wherein the marking to be produced comprises several cells, each cell corresponding to one pixel of the image data, in which at least one light beam is emitted with light emitting means; a deflection direction of scanning means for deflecting the light beam is scanned over the object; when the deflection direction points at a cell corresponding to a pixel with a first pixel value, the light emitting means are activated to produce a mark in that cell; and; when the deflection direction points at a cell corresponding to a pixel with a second pixel value, the light emitting means are deactivated to leave that cell blank. The method is characterized in that the deflection direction is altered in a meander pattern for cells that correspond to pixels with first pixel values, and in a straight movement for cells that correspond to pixels with second pixel values. The invention further relates to a marking apparatus for applying a marking on an object.

12 Claims, 4 Drawing Sheets

(56) References Cited

U.S. PATENT DOCUMENTS

| | | | | |
|---|---|---|---|---|
| 5,946,103 | A | * | 8/1999 | Curry .................... G06T 1/0028 |
| | | | | 235/494 |
| 6,081,345 | A | * | 6/2000 | Curry ................ H04N 1/32256 |
| | | | | 380/54 |
| 2006/0140441 | A1 | * | 6/2006 | Miller ................ H04N 1/32251 |
| | | | | 713/176 |
| 2007/0051813 | A1 | * | 3/2007 | Kiuchi .................... G06K 7/14 |
| | | | | 235/462.1 |
| 2014/0263667 | A1 | * | 9/2014 | Mege ............... G06K 19/06037 |
| | | | | 235/494 |
| 2015/0069117 | A1 | * | 3/2015 | Rapoport ........... B41J 11/00214 |
| | | | | 235/494 |
| 2018/0333962 | A1 | | 11/2018 | Greggio |

* cited by examiner

Fig. 1

Prior Art

Fig. 2

Prior Art

Fig. 3

Prior Art

Fig. 4

Prior Art

METHOD AND MARKING APPARATUS FOR APPLYING A MARKING ON AN OBJECT

The present invention relates in a first aspect to a method for applying a marking on an object according to the preamble of claim 1. In a second aspect, the invention relates to a marking apparatus according the preamble of claim 12.

In a generic method for applying a marking on an object according to image data, wherein the image data comprises pixels with first pixel values and pixels with second pixel values, and wherein the marking to be produced comprises several cells, each cell corresponding to one pixel of the image data, at least the following method steps are carried out: at least one light beam is emitted with light emitting means; a deflection direction of scanning means for deflecting the light beam is scanned over the object; when the deflection direction points at a cell corresponding to a pixel with a first pixel value, the light emitting means are activated to produce a mark in that cell; and when the deflection direction points at a cell corresponding to a pixel with a second pixel value, the light emitting means are deactivated to leave that cell blank.

A conventional marking apparatus is adapted to apply a marking on an object according to image data, wherein the image data comprises pixels with first pixel values and pixels with second pixel values, and wherein the marking to be produced comprises several cells, each cell corresponding to one pixel of the image data. The marking apparatus comprises at least light emitting means for emitting at least one light beam, scanning means for deflecting the light beam, the scanning means being adapted to scan a deflection direction for the light beam over the object, and control means that are adapted to activate the light emitting means when the deflection direction points at a cell corresponding to a pixel with a first pixel value to produce a mark in that cell, and to deactivate the light emitting means when the deflection direction points at a cell corresponding to a pixel with a second pixel value to leave that cell blank.

Hence on the object, which may be any kind or article or product, a marking corresponding to the image data is produced by illuminating the object with a light beam.

The image data's first pixel values may, for instance, indicate black or dark pixels whereas second pixel values indicate white pixels, or vice versa. In the following, these terms are not intended to restrict the meaning of, e.g., a first pixel value to a black pixel. Each pixel of the image data corresponds to a cell or field within the marking to be applied on the object. The term of a cell is used to refer to a certain area on that object. These areas correspond in their arrangement to the arrangement of the pixels within the image. The cell itself is not produced or drawn with the marking apparatus but rather the cells are filled with a mark or left blank, i.e., no mark is produced in that cell.

In principle, a cell may be filled with a single dot produced with the light beam. However, this leads to problems when filling a larger cell with a large dot. As a light beam usually has a higher intensity in its center, a large dot would entail undue high light intensities at the dot's center. Therefore, for producing a mark that corresponds to a single pixel, the pertaining cell is not merely filled by a single dot. The cell is rather filled with several dots or one or more lines produced with the light beam. To this end, the light beam may be moved over the cell. For a white pixel, the corresponding cell remains blank or empty by deactivating the light emitting means when the laser beam would be directed onto that cell.

Typically, the pixels of the image data are arranged in one or more lines and one or more columns. The corresponding cells constituting the marking are thus also arranged in one or more lines and one or more columns. The marks in the cells may also be referred to as printed pixels.

A marking such as a two dimensional code also known as data matrix code, international data ID matrix or quick response QR code is widely used to mark items or products to encode best before dates or general product information. Typically light emitting means such as a laser are used to apply the marking either directly to the product or to a label.

The information to be encoded can be for instance text or numeric data. The length of the encoded data depends on the number of pixels in image data of the marking. Error correction codes are often used to increase reliability, so that even if one or more cells are unreadable, the message can still be read.

The information to be marked is typically stored as image data with lines or rows and columns of pixels encoding information. As more data is encoded in the marking, the number of pixels increases. For instance the marking sizes vary from 10×10 to 144×144 according to the ECC 200 standard, and from 9×9 to 49×49 according to the ECC 000-140 standards. Thus, the marking of products includes the application of compressed information and is a time consuming process.

In addition, in production of the articles, these are typically moved quickly for instance on conveyer belts. The marking of the product needs to comply with the speed the product is moving by. Therefore, the marking process needs to be quick. However, any distortions during application of the marking such as vibrations of the conveyer belt may cause errors in the applied marking. This leads to a decreased readability.

In the prior art it is suggested to increase the overall size of the marking. This way one has larger pixels where distortions may not affect the readability of the marking. However, in most applications an enlarged marking is not applicable as there is only a limited amount of space or only a designated area available for the marking on the product or label. Thus, increasing the marking in size is not possible.

Further the prior art suggested to increase the error correction component of the marking. This way more information included in the marking is dedicated to correct errors caused by corrupted parts of the marking. This way the marking does not necessarily increase in overall size. However, the marking caries less information as more pixels are used for error correction and less pixels for coding actual information is available.

Therefore, it is an object of the invention to provide a method for applying a marking on an object and a marking apparatus that are particularly fast in applying a marking and mitigate the effects of distortions to the marking process.

This objective is solved by a method having the features of claim 1 and a marking apparatus as described in claim 12.

Preferred embodiments are given in the dependent claims as well as in the following description, in particular in connection with the attached figures.

According to the invention, the method of the above mentioned kind is characterized in that the deflection direction is altered in a meander pattern for cells that correspond to pixels with first pixel values, and in a straight movement for cells that correspond to pixels with second pixel values.

The marking apparatus of the above mentioned kind is, according to the invention, characterized in that the control means are adapted to alter the deflection direction in a meander pattern for cells that correspond to pixels with first pixel values, and in a straight movement for cells that correspond to pixels with second pixel values.

It is thus a core idea that the scanning means are controlled to alter their deflection direction in two different ways depending on whether the deflection direction points at a cell corresponds to a pixel with a first or second pixel value. For a first or dark pixel value where the light beam is activated, the deflection direction is moved in a meander shape, i.e., a wave like fashion or waveform. For a second or bright pixel value where the light beam is deactivated, it is moved in a straight line without meandering to reach as quickly as possible the next cell corresponding to a dark pixel.

Advantageously, these combinations of movements lead to a reduction in time for producing the marking. One reason being that the deflection direction of the scanning means is moved only once and in the shortest possible way over a cell that is to be left blank. Other conventional patterns for the scanning means would, in contrast, cross such a blank cell several times. A further reason for the time reduction lies in that the meander pattern with its comparably short longitudinal lines leads to a narrow span of possible velocities of the scanning means. This in turn reduces possible waiting times after a velocity jump of the scanning means, which may occur when moving or jumping over a blank cell. As a further advantage, a meander or waveform is comparably stable towards distortions such as vibrations or shocks to the object.

Advantageously the afore-described advantages can, in principle, already be achieved by reconfiguring the control unit of a conventional marking apparatus to perform the invention. This way no new parts need to be installed or included in the apparatus.

The deflection direction of the scanning means define an impinging region on the object onto which the light beam is directed or, in the case of the light emitting means being deactivated, onto which a light beam would be directed. The meander pattern in which the deflection direction is amended is to be understood such that the impinging region is moved in a meander pattern.

A meander pattern may comprise any pattern with bend or straight lines that have a direction component in the same direction. Such lines may be connected to each other or separated. Preferably, at least some lines or line parts of a meander pattern are parallel or antiparallel to each other.

The straight line movement for each second pixel value is to be understood such that the scanning means move the impinging region, on which the laser beam would impinge on the object if the laser beam was turned on, over a cell corresponding to a second pixel value in a straight line.

The marking to be produced may consist or comprise several marks and blank areas. Each mark corresponds in position to one pixel of the image data with a first pixel value, and each blank area corresponds in position to one pixel with a second pixel value. The arrangement of the marks and blank areas is described via cells. The term "cell" is merely used to designate a certain area on the object, however, a cell itself is not formed by any line or rectangle.

In general, the scanning means may be any means that can be moved to alter a deflection direction. To this end, the scanning means may comprise one or more movable optical elements such as mirrors or lenses, or one or more optical fibers that are translationally moved or rotated to adjust the deflection direction. Preferably, two galvanometer scanning mirrors are provided that can be rotated about different axes.

The at least one light beam may be of any kind as long as it is suited to manipulate the object. Depending on the kind of object, in particular its material, different wavelengths and/or light intensities may be suitable. For marking a variety of different objects, the light emitting means may comprise several light units that emit light with different wavelengths and/or intensities. These light beams may be directed onto a common beam path and further to the scanning means. Alternatively or additionally, several light beams may simultaneously be used for producing marks on different areas, or on a common spot on the object for increased light intensity, which may be used for producing different shades of colour or grey level.

For a focused high intensity beam, the light emitting means may comprise at least one laser. The laser may be a continuous wave laser or a pulsed laser. In the latter case a mark within a cell is formed with several dots that may or may not overlap each other. Preferably, however, the mark is formed by a continuous line without interruptions.

The straight movement for one or more cells that correspond to pixels with second pixel values can be understood such that a deflection direction of the scanning means is adjusted in the shortest possible way to point at a next cell in which a mark is to be formed. If several cells that are to be left blank are in a row, the straight movement may span over these several cells, until in a next cell corresponding to a pixel with a first pixel value, a meander movement pattern of the deflection direction follows.

The meander pattern preferably comprises at least two longitudinal movements connected with a loop movement. The light emitting means may be activated without pause during this movement to produce a mark with at least two longitudinal lines connected with a loop, i.e., a mark in a meander shape or pattern. Such a mark may be formed in each cell corresponding to a pixel with a first pixel value. The longitudinal lines are preferably straight lines.

The longitudinal movements and hence the longitudinal lines may be parallel or perpendicular to a column direction, i.e., a direction in which the cells of one column are arranged. Alternatively, the longitudinal movements may be oblique or angled to the column direction. In that case the longitudinal movement has two direction components perpendicular to each other, wherein one of the direction components is parallel and the other perpendicular to the column direction. The larger component of the longitudinal movement may either be along the column direction or perpendicular thereto. When in the following reference is made to the direction of the longitudinal movement, for an oblique longitudinal movement this can be understood as the direction of the main component of the oblique longitudinal movement.

The loop of a meander may have a round shape or a straight shape that is at an angle to the longitudinal lines. Consequently, the loop may lead to the shape of a U or V or, together with parts of the longitudinal lines, an open rectangle may be formed. In a particularly preferred variant, the movement for the loop overlaps strongly with the longitudinal movements, leading to a zigzag meander shape, such as the shape of a sequence of Vs, i.e., VVVV.

The marking to be produced may be a black and white or two colour image. Alternatively, first pixel values may comprise subgroups of different pixel values, in particular for marking shades of grey or different colors. All such pixel values have in common that the light emitting means are activated for marking these pixels whereas the light emitting means are deactivated for marking the pixels with the second pixel values.

The activation and deactivation of the light emitting means may be understood as whether or not a light beam is transmitted onto the object via the scanning means and used to produce the marking. Hence, a deactivation may also comprise the case that the light emitting means output continuously a light beam which is then blocked or directed somewhere else where it is not used to produce the aforereferenced marking.

The image data may generally be given in any form. Pixels and pixel values may not be present in image data ab initio, but may be calculated from the image data and forwarded to the control unit. This may be the case for vector graphics or other instructions.

The pixels and hence the cells of the marking are usually two-dimensionally arranged in rows and columns. The rows and columns may be perpendicular to each other, or bent, blurred or distorted in other ways, which may be beneficial for producing a marking on a bent surface, e.g. a label of a bottle. However, other configurations of the cells are also possible. Preferably, the cells directly border each other. Hence, a meander shape of one cell can be continued in a directly bordering cell without any gaps and irregularities in the meander shape.

For a good readability of the marking, a cell with a mark should be filled by that mark to a high degree. To this end, neighbouring longitudinal lines of one mark preferably touch each other. In other words, in a direction perpendicular to the longitudinal lines, no free space is left between those lines.

Depending on the product and the desired marking appearance, it may also be advantageous if a small gap between neighbouring longitudinal lines remains. This gap in a direction perpendicular to the longitudinal lines should be smaller or equal the width of a longitudinal line, preferably smaller or equal half a width. This further speeds up the marking process.

For filling a cell with a mark, the number of longitudinal lines within that cell may be equal to D divided by W, wherein D is the dimension or height of the cell in a direction perpendicular to the longitudinal lines, and W is the width of a longitudinal line.

If the cells form a pattern of rows and columns, the deflection direction is preferably scanned over the cells column by column, and the longitudinal lines of the marks are formed in the direction of the rows, i.e. transverse or perpendicular to the direction in which the deflection direction progresses from cell to cell within one column. In this way, the loop movement of progressing from one longitudinal movement to the next already moves the deflection direction towards the next cell to be marked. Hence, the meander pattern itself constitutes a scanning motion with which the deflection direction is moved to the next cell.

Alternatively, the longitudinal lines of the marks are formed in the direction of the columns. Depending on the image and properties of the scanning means, this variant may lead to a time reduction, as the velocity of the scanning means during a longitudinal movement can be continued to reach the next cell, without a change in direction and hence without any decelerations being necessary.

It is preferred that each mark formed in one of the cells corresponding to pixels with first pixel values has an even number of loops and hence an odd number of longitudinal lines. This may be advantageous when the marking process of one column is concluded and the light beam has to be directed to the next column. In such a case, an even number of loops may often lead to no jump of the light beam being necessary.

Alternatively, an odd number of loops for each mark may also be preferred. This may simplify the control algorithms of the control means; for a deflection direction after a meander movement is not altered in the direction of the longitudinal lines but only perpendicularly thereto, i.e., in the direction of the columns.

For a further reduction of required time, the progression of the deflection direction within one column may be counter to the progression within a neighbouring column. Hence, when the deflection direction is moved downwards in one column, it is moved upwards in the next column. The downwards and upwards movements may be achieved with the loop movements of the meanders and the straight movements during which no mark is produced, whereas the longitudinal movements of the meanders may be perpendicular to the downwards and upwards movements.

The scanning movement of column by column may be understood such that only cells within one column are scanned and then it is continued to the next column. In an alternative variant of the column by column movement, the deflection direction progresses from cell to cell within a first column; however, two or more neighbouring cells of the same row, each being associated with a first pixel value, may be scanned before the deflection direction progresses to the next cell within the first column. As a consequence, at least one meander pattern spans over neighbouring cells corresponding to pixels with first pixel values such that all longitudinal lines of the mark produced with this meander pattern span over these cells whereas each loop is formed in only one of these neighbouring cells. In this way, a lower number of loops is required for the whole marking. As each loop is connected with decelerating the scanning means and accelerating the scanning means in a different direction, a reduction of the number of loops leads to a reduced time required to produce the marking.

Such a meander shape spanning over several cells is also advantageous when the direction of the longitudinal lines is mainly in the direction along a column.

Depending on the application of the invention, a meander shape of a mark may be regarded as detrimental to the readability of the marking. To circumvent this problem, the meander pattern for altering the deflection direction comprises at least two longitudinal movements connected with a loop movement, and the light emitting means are activated only during the longitudinal movements but not during the loop movements, to produce a mark with at least two longitudinal lines. These lines are consequently not connected with a loop. However, the movement of the scanning means is unaffected by this variant and still leads to a meander pattern of the deflection direction. The activation of the light emitting means for a cell corresponding to a first pixel value is thus not to be understood as a continuous but as an activation with interruptions. This embodiment of the invention may be combined with the other variants described with the exception that the light emitting means are deactivated during the loop movement.

In a further embodiment the meander pattern comprises a zigzag shape in which a produced mark comprises several lines, wherein neighbouring lines are oblique to each other. Between neighbouring lines an angle of preferably 5 to 25 degrees may be formed. In a zigzag shape, a line and the next but one line may be parallel to each other. In such a meander pattern for the deflection direction, only one speed component is altered whereas another speed component perpendicular thereto is kept constant, which leads to a zigzag shape. This may simplify the setup and/or lead to a reduced marking time.

In the column by column scanning, the deflection direction is turned to a next column when all cells corresponding to first pixel values of a former column have been marked.

Under certain circumstances, the light emitting means may stay activated in this case, which leads to a better time usage in producing the marking. This can be achieved if a mark has been created in a last cell of one column such that the mark ends bordering a next cell of a neighbouring column, and if the next cell corresponds to a pixel with a first pixel value. In this case the light emitting means may stay activated while the deflection direction is moved from the last cell to the next cell. This is explained in detail below: A first column may be scanned from top to bottom. A next column is than scanned from bottom to top. A mark produced with the meander pattern in the lowest cell of the first column may start, for instance, in the top left corner of a cell, continues in a meander fashion, and ends at the bottom right corner of that cell. If the next column is on the right side of the first column, the bottom right end of the mark in the lowest cell of the first column directly borders the next cell to be marked. Hence, the meander pattern can continue in that next cell without interruption in the emission of the light beam. In the next cell, the meander pattern starts at the bottom left corner of that cell, continues in a meander shape upwards, and ends at the top right corner.

The movements and directions indicated are to be understood with respect to the object. The object itself, however, may be moved, e.g., on a conveyer belt. The meander shape and the other described movements are thus superimposed with this object movement.

A better understanding of the invention and various other features and advantages of the present invention will become readily apparent by the following description in connection with the schematic drawings, which are shown by way of example only, and without limitation, wherein the same reference numerals may refer to alike or substantially alike components.

Figure 1:
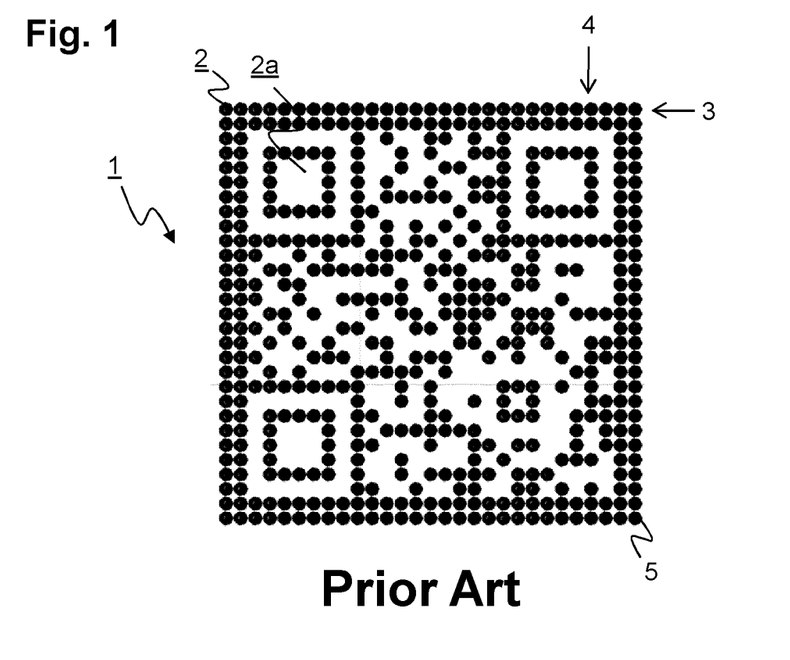
FIG. 1 shows a marking according to a first prior art.

FIG. 1 shows a first prior art of forming a marking 1 also known as dot mode forming. The marking corresponds to image data with pixels arranged in rows and columns. Consequently, also the marking consists of cells 2, 2a arranged in rows or lines 3 and columns 4. Each cell 2 corresponds to one pixel which may have a first pixel value or a second pixel value, e.g. a dark or a bright pixel. A cell 2 is filled with a mark 5 if it corresponds to a first pixel value or left blank if it corresponds to a second pixel value, as shown for cell 2a. In the case of marking e.g. food products or beverages, the marking may contain information such as a best before date or general information about ingredients or similar.

Figure 2:
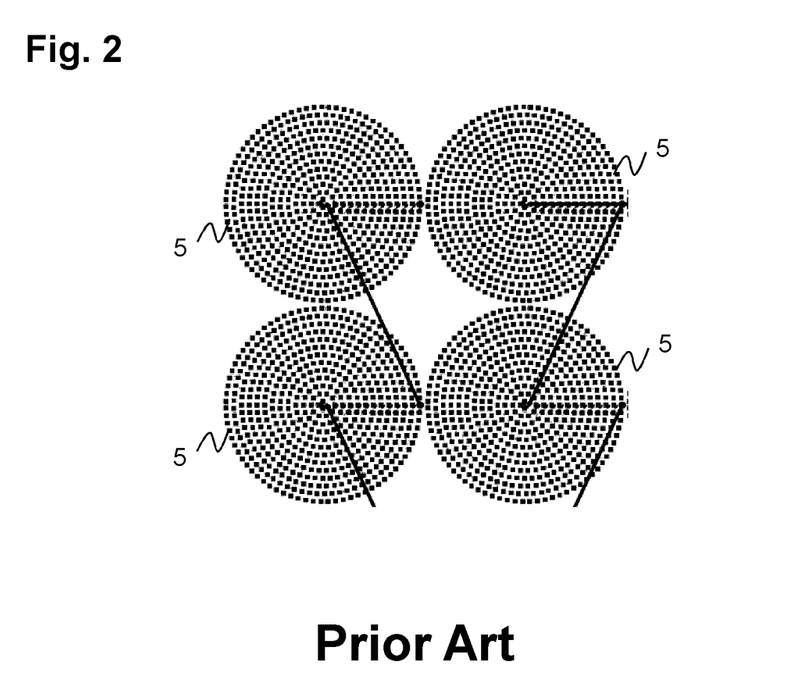
FIG. 2 shows in detail printed pixels according to a first prior art.

FIG. 2 shows in detail four neighboring marks 5, i.e. four neighboring cells each being filled with a mark 5. According to the first prior art, a light beam is moved in a spiral shape creating single dots along the spiral to form each pixel 5. In bold lines the path of the deflection direction of the scanning means is indicated for continuing from one cell to the next. During this movement, the light emitting means are usually deactivated, i.e. the bold lines are not part of the marking. This technique belongs to cell-by-cell render methods. It is, however, comparably time consuming.

Figure 3:
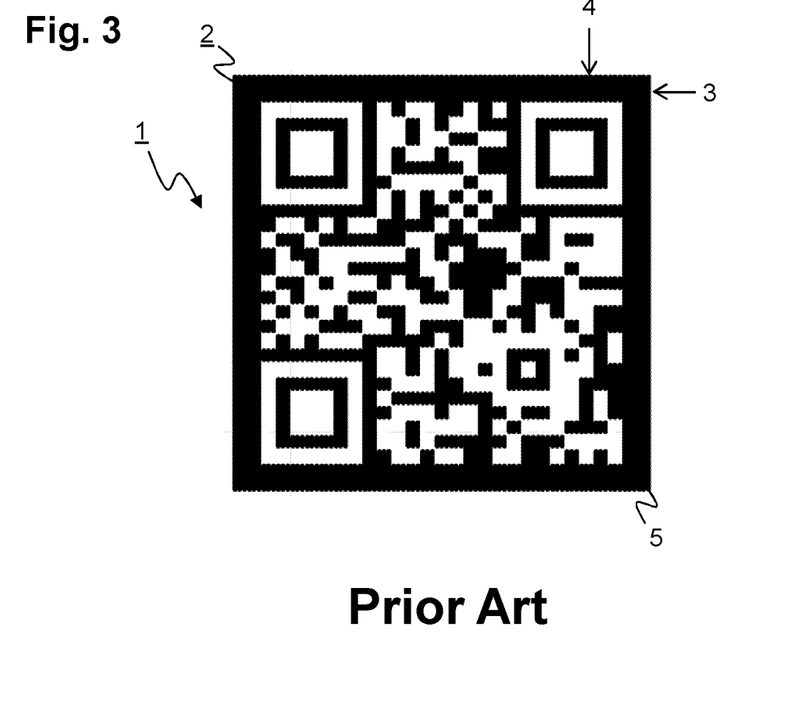
FIG. 3 shows a marking according to a second prior art.
Figure 4:
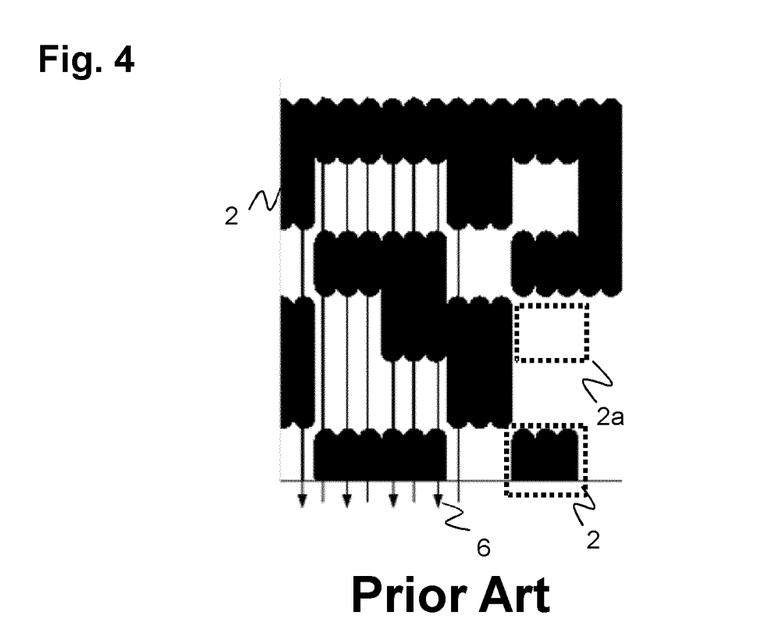
FIG. 4 shows a schematic of forming a marking according to a second prior art.

FIG. 3 shows a second prior art method of forming a marking 1. A detail of this figure is shown enlarged in FIG. 4. According to the second prior art method a light beam is moved along lines 6 over the whole area of the marking. The light beam is not only moved along one column once, but three times. In this way a mark created in one cell 2 (indicated with a dotted box) consists of three lines next to each other, resulting in roughly a square shape. A cell 2a to be left blank is also scanned three times, with the light emitting means being deactivated.

When the deflection direction passes the cells to be left blank, the scanning means are often accelerated to a higher scanning speed. When reaching a cell in which a mark is to be produced, the scanning speed is again decelerated. In these cases, an additional waiting time is to be added to allow for undesired vibrations to die out. This again leads to longer marking times. The overall time to produce the marking is again not satisfactory, and often even higher than the time requirements of the method described in connection with FIGS. 1 and 2.

The invention allows markings to be produced faster. An example of a method of the invention is described with reference to FIG. 5, which shows a marking 1 as well as auxiliary lines that are not part of the marking but useful in explaining the method.

Figure 5:
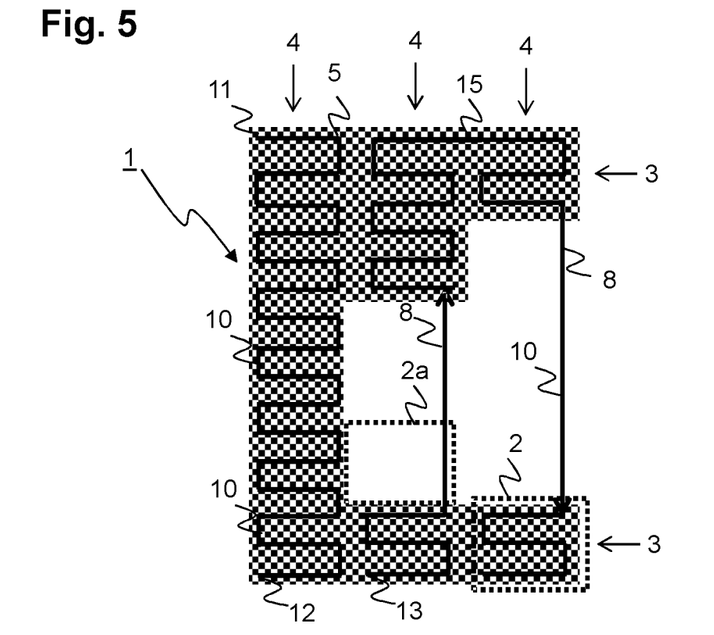
FIG. 5 shows a detail of a marking and moving a light beam according to a first embodiment of the invention.

Again, a marking 1 corresponding to image data is to be formed. The image data comprises pixels with first pixel values, corresponding to a mark 5 that is to be produced in a cell 2, and with second pixel values, corresponding to an empty cell 2a without a mark. The cells 2 corresponding to first pixel values are shown checkered, and the cells 2a corresponding to second pixel values are left blank. One blank cell 2a is indicated with a rectangular frame.

A light beam is scanned over the area of the marking to produce the marking 1. In areas that are to be left blank, the light beam is deactivated. This scanning motion is carried out with scanning means which have a variable deflection direction for the light beam. FIG. 5 shows the path of the deflection direction 10, i.e., on which areas the deflection direction successively points. The main idea of the invention resides in the shape of this path and in that two different shapes are used dependent on whether the deflection direction points at a cell 2 in which a mark 5 is to be produced or a cell that is to be left empty.

At the start of the marking process, the deflection direction points at a location 11, e.g. a top left corner of a first cell in a first column. This cell corresponds to a first pixel value and thus a mark is to be produced in that cell. The light emitting means are hence activated. The deflection direction and thus the light beam are moved in a meander pattern within that cell. That is, the deflection direction is moved to the right to produce a longitudinal line, than downwards to produce a loop part, and then left to produce another longitudinal line. Further loops and longitudinal lines may follow within that cell.

In the example shown, all cells of the first column correspond to first pixel values. Hence, the light emitting means stay activated while the scanning over the next cells in the first column continues. In this way, the light beam meanders downwards and produces in each of these cells a meander mark. After concluding with the first column, the deflection direction is moved from position 12 to position 13 which is a starting point in the neighboring cell of the next column. During this movement no light beam is emitted. Starting from position 13, the meander movement continues along this column upwards until a cell 2*a* is reached that is to be left blank. Now the light beam is turned off and, instead of a meander pattern, the deflection direction is moved in a straight line 8 to reach the next cell at point 14, where the light beam is turned on and a meander pattern follows. When scanning of this column is concluded at point 15, scanning of the next column (to the right) follows. As point 15 directly touches the cell of the next column, the light beam need not be turned off, in contrast to the jump from point 12 to point 13.

A distance between longitudinal lines in one cell 2 is preferably chosen to correspond to the thickness or width of one line; in that way, no gap is left between the lines.

Instructions for such a meander pattern to be input to the control unit may be expressed as follows, in particular when starting at point 11:

Step A) Move the deflection direction in the row direction for as much as the cell width minus one light beam width by subtracting the light beam width the produced line has a length equal to the cell width, i.e. the dimension of the cell in the direction of the rows; in this way the longitudinal line starting from point 11 is produced;

Step B) Move in the row direction for as much as (cell height minus light beam width) divided by (longitudinal lines per cell minus one); the cell height minus light beam width indicates the distance from the center of the first longitudinal line to the last longitudinal line to be produced in that cell; this distance is to be divided by the number of steps in the row direction, which is one lower than the number of longitudinal lines per cell;

Now steps A) and B) are repeated, but with each pair of consecutive longitudinal lines being counter to each other, in particular being antiparallel, until the end of the cell is reached after a step A).

If now the next cell is also to be filled with a mark, the preceding steps are continued. Otherwise, a straight line movement in the row direction follows until the next cell to be filled with a mark is reached or until the end of the column is reached.

When a column end is reached, the deflection direction is moved to the next column, and this column and any following columns are processed in the afore-described way until the whole marking is produced.

In general, markings are larger than the one shown in FIG. 5.

Figure 6:
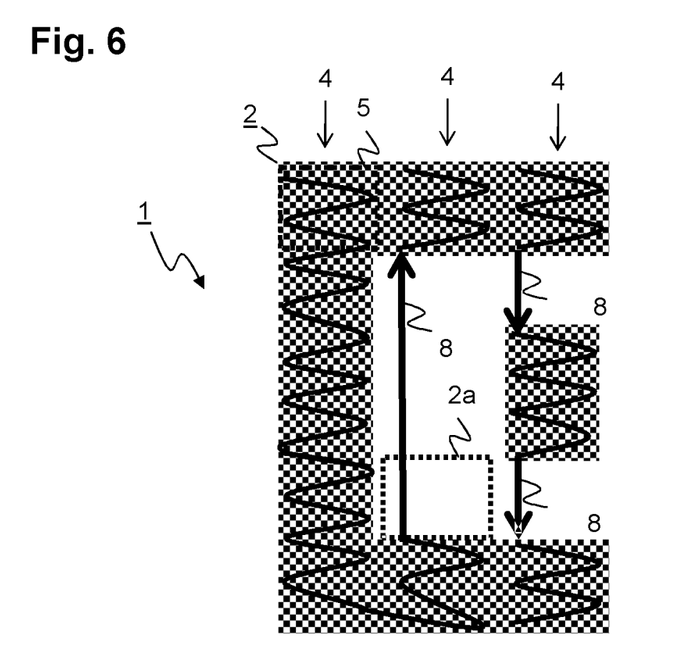
FIG. 6 shows a detail of a marking and moving a light beam according to a second embodiment of the invention.

With respect to FIG. 6, another embodiment of the invention will be described. FIG. 6 differs from FIG. 5 in the shape of the meander pattern. In FIG. 6, a meander again starts with a longitudinal line. This line is, however, not perpendicular to a row direction 4, but at another angle thereto. The line thus has a component in the row direction and a component in the column direction. Furthermore, the line is slightly bent to progress in the row direction. A loop of such a meander is formed by reversing the speed of the movement component in the row direction; the movement component in the column direction is kept constant.

Figure 7:
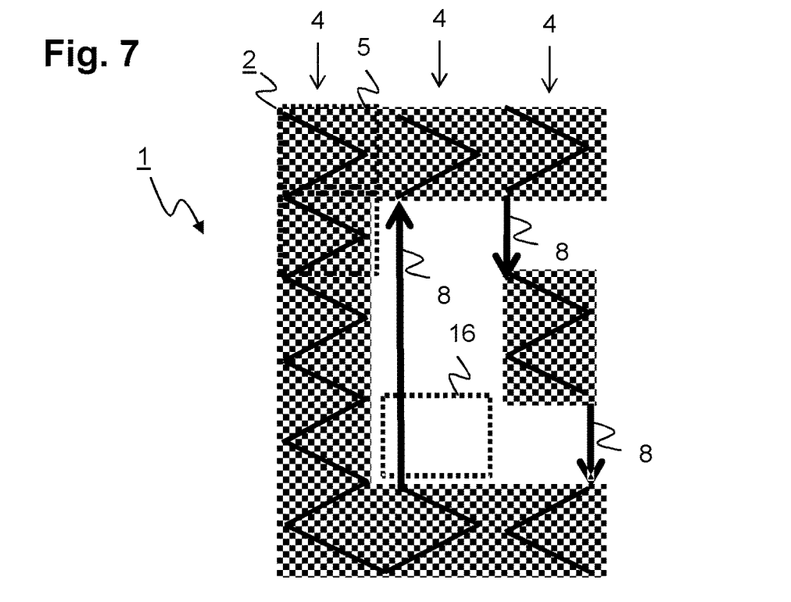
FIG. 7 shows a detail of a marking and moving a light beam according to a third embodiment of the invention.

Another embodiment of the invention is shown in FIG. 7. In this case, a meander comprises straight lines with a component is the row direction and a component in the column direction. Each second straight line is parallel to each other.

Figure 8:
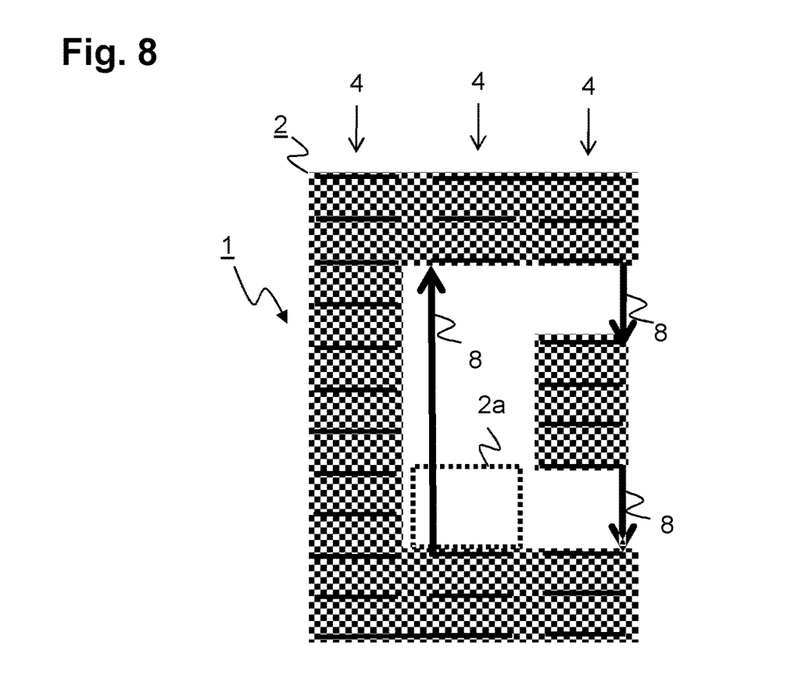
FIG. 8 shows a detail of a marking and moving a light beam according to a fourth embodiment of the invention.

FIG. 8 shows a further variant of the invention. The meander movement of the deflection direction is equal to the one described with reference to FIG. 5. However, the light emitting means are activated only during the longitudinal line movements but not during the loop movements, i.e., the movements in the row direction. As a consequence, the mark produced in one cell 2 consists of several longitudinal lines that are not connected to each other.

The method and the marking apparatus according to the invention allow to form a marking 1 on an object fast, efficiently and with a reduced likelihood of being distorted. In particular, the method does not have as much delay time as the prior art, thus it can be performed faster. By selecting the width of the light beam a high quality marking 1 in particular with a high readability can be formed.

The invention claimed is:

1. A method for applying a marking on an object according to image data,
wherein the image data comprises pixels with first pixel values and pixels with second pixel values, and
wherein the marking to be produced comprises several cells, each cell corresponding to one pixel of the image data, in which
at least one light beam is emitted with light emitting means,
a deflection direction of scanning means for deflecting the light beam is scanned over the object,
when the deflection direction points at a cell corresponding to a pixel with a first pixel value, the light emitting means are activated to produce a mark in that cell, and
when the deflection direction points at a cell corresponding to a pixel with a second pixel value, the light emitting means are deactivated to leave that cell blank,
wherein the deflection direction is altered in a meander pattern for cells that correspond to pixels with first pixel values, and in a straight movement for cells that correspond to pixels with second pixel values; and,
wherein the meander pattern starts and ends at a boarder of a cell.

2. The method according to claim 1,
characterized in that the meander pattern comprises at least two longitudinal movements connected with a loop movement to produce a mark with at least two longitudinal lines connected with a loop.

3. The method according to claim 2,
wherein neighbouring longitudinal lines of one mark touch each other.

4. The method according to claim 1,
wherein for filling a cell with a mark, the number of longitudinal lines within that cell is equal to D/W, wherein D is the dimension of the cell in a direction perpendicular to the longitudinal lines, and W is the width of a longitudinal line.

5. The method according to claim 2,
wherein the cells form a pattern of rows and columns, the deflection direction is scanned over the cells column by column, and the longitudinal lines of the marks are formed in the direction of the rows.

6. The method according to claim 2,
wherein the cells form a pattern of rows and columns, the deflection direction is scanned over the cells column by column, and the longitudinal lines of the marks are formed in the direction of the columns.

7. The method according to claim 1,
wherein each mark formed in one of the cells corresponding to pixels with first pixel values has an even number of loops.

8. The method according to claim 2,
wherein if a mark has been created in a last cell of one column such that the mark ends bordering a next cell of a neighbouring column, and if the next cell corresponds to a pixel with a first pixel value, than the light emitting means stay activated while the deflection direction is moved from the last cell to the next cell.

9. The method according to claim 1,
wherein at least one meander pattern spans over neighbouring cells corresponding to pixels with first pixel values such that all longitudinal lines of the mark produced with this meander pattern span over these cells whereas each loop is formed in only one of these neighbouring cells.

10. The method according to claim 1,
wherein the meander pattern comprises at least two longitudinal movements connected with a loop movement, and the light emitting means are activated only during the longitudinal movements but not during the loop movements, to produce a mark with at least two longitudinal lines.

11. The method according to claim 1,
wherein the meander pattern comprises a zigzag shape in which a produced mark comprises several lines, wherein neighbouring lines are oblique to each other.

12. A marking apparatus for applying a marking on an object according to image data,
wherein the image data comprises pixels with first pixel values and pixels with second pixel values, and
wherein the marking to be produced comprises several cells, each cell corresponding to one pixel of the image data, the marking apparatus comprising
light emitting means for emitting at least one light beam,
scanning means for deflecting the light beam, the scanning means being adapted to scan a deflection direction for the light beam over the object, and
control means that are adapted to activate the light emitting means when the deflection direction points at a cell corresponding to a pixel with a first pixel value to produce a mark in that cell, and to deactivate the light emitting means when the deflection direction points at a cell corresponding to a pixel with a second pixel value to leave that cell blank,
wherein the control means are adapted to alter the deflection direction in a meander pattern for cells that correspond to pixels with first pixel values, and in a straight movement for cells that correspond to pixels with second pixel values; and,
wherein the meander pattern starts and ends at a boarder of a cell.

\* \* \* \* \*